United States Patent
Kim et al.

(10) Patent No.: US 12,431,571 B2
(45) Date of Patent: Sep. 30, 2025

(54) BATTERY MODULE, BATTERY PACK INCLUDING BATTERY MODULE, AND VEHICLE INCLUDING BATTERY PACK

(71) Applicant: LG ENERGY SOLUTION, LTD., Seoul (KR)

(72) Inventors: Se-Ho Kim, Daejeon (KR); Jae-Hun Yang, Daejeon (KR); Jung-Hoon Lee, Daejeon (KR); Sang-Yoon Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 670 days.

(21) Appl. No.: 17/791,632

(22) PCT Filed: Nov. 15, 2021

(86) PCT No.: PCT/KR2021/016676
§ 371 (c)(1),
(2) Date: Jul. 8, 2022

(87) PCT Pub. No.: WO2022/108280
PCT Pub. Date: May 27, 2022

(65) Prior Publication Data
US 2023/0038951 A1    Feb. 9, 2023

(30) Foreign Application Priority Data
Nov. 23, 2020  (KR) .................. 10-2020-0158076

(51) Int. Cl.
*H01M 50/242*  (2021.01)
*H01M 50/211*  (2021.01)

(52) U.S. Cl.
CPC ....... *H01M 50/242* (2021.01); *H01M 50/211* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 5,409,787 | A | 4/1995 | Blanyer et al. |
| 2008/0070068 | A1 | 3/2008 | Fritz et al. |

(Continued)

FOREIGN PATENT DOCUMENTS

| | | |
|---|---|---|
| CN | 108501800 A | 9/2018 |
| CN | 108807749 A | 11/2018 |

(Continued)

OTHER PUBLICATIONS

International Search Report for PCT/KR2021/016676 mailed on Feb. 24, 2022.

(Continued)

*Primary Examiner* — Wyatt P McConnell
(74) *Attorney, Agent, or Firm* — Birch, Stewart, Kolasch & Birch, LLP

(57) ABSTRACT

A battery module includes a battery cell assembly including at least one battery cell, a base plate configured to support a lower side of the battery cell assembly, and a pressing pulley elastically connected to the base plate and configured to cover an upper side of the battery cell assembly, the pressing pulley being elastically deformable in a vertical direction of the battery cell assembly according to cell swelling of the battery cell assembly.

16 Claims, 9 Drawing Sheets

(56) References Cited

U.S. PATENT DOCUMENTS

| | | | |
|---|---|---|---|
| 2019/0198830 A1 | 6/2019 | Kawakami et al. | |
| 2019/0198911 A1 | 6/2019 | Kim et al. | |
| 2019/0363392 A1 | 11/2019 | Kim et al. | |

FOREIGN PATENT DOCUMENTS

| | | | | |
|---|---|---|---|---|
| CN | 109616596 A | 4/2019 | | |
| CN | 109962192 A | 7/2019 | | |
| CN | 111146384 A | 5/2020 | | |
| CN | 210778741 U | 6/2020 | | |
| CN | 107492612 A | 7/2025 | | |
| FR | 2 865 853 A1 | 8/2005 | | |
| JP | 7-183045 A | 7/1995 | | |
| JP | 2006-102771 A | 4/2006 | | |
| JP | 6255970 B2 | 1/2018 | | |
| KR | 10-2012-0014961 A | 2/2012 | | |
| KR | 10-2013-0123762 A | 11/2013 | | |
| KR | 10-2018-0113357 A | 10/2018 | | |
| KR | 10-1939049 B1 | 1/2019 | | |
| KR | 10-2019-0031831 A | 3/2019 | | |
| KR | 10-2019-0078221 A | 7/2019 | | |
| WO | WO 2014/167019 A1 | 10/2014 | | |
| WO | WO 2020/219998 A1 | 10/2020 | | |
| WO | WO-2020219996 A1 * | 10/2020 | .......... | H01M 10/625 |

OTHER PUBLICATIONS

Extended European Search Report for European Application No. 21895048.3, dated Mar. 11, 2024.

* cited by examiner

BATTERY MODULE, BATTERY PACK INCLUDING BATTERY MODULE, AND VEHICLE INCLUDING BATTERY PACK

TECHNICAL FIELD

The present disclosure relates to a battery module, a battery pack including the battery module, and a vehicle including the battery pack.

The present application claims priority to Korean Patent Application No. 10-2020-0158076 filed on Nov. 23, 2020 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components.

In the case of a conventional battery module, it is important to apply a pressing force within a certain range to the battery cell in order to improve performance such as the lifespan of the battery cell. In addition, it is important to control the expansion of the battery cell, namely cell swelling.

Accordingly, it is demanded to find a way to provide a battery module, which may improve the performance of the battery cell and effectively control cell swelling, a battery pack including the battery module, and a vehicle including the battery pack.

DISCLOSURE

Technical Problem

The present disclosure is directed to providing a battery module, which may improve the performance of a battery cell and effectively control cell swelling, a battery pack including the battery module, and a vehicle including the battery pack.

Technical Solution

In one aspect of the present disclosure, there is provided a battery module, comprising: a battery cell assembly including at least one battery cell; a base plate configured to support a lower side of the battery cell assembly; and a pressing pulley elastically connected to the base plate and configured to cover an upper side of the battery cell assembly, the pressing pulley being elastically deformable in a vertical direction of the battery cell assembly according to cell swelling of the battery cell assembly.

The pressing pulley may include a pressing plate disposed at an upper side of the battery cell assembly and configured to be movable along the vertical direction; a pair of pulleys connected to the pressing plate and respectively disposed at a pair of sides of the battery cell assembly; and a pair of elastic straps respectively connected to the pair of pulleys and fixed to the base plate.

Each of the pair of pulleys may include a pulley body connected to the elastic strap; a pulley shaft provided through the pulley body; and a connection member configured to connect the pulley shaft and the pressing plate.

Each of the pair of pulleys may include at least one elastic spring provided to the pulley shaft and disposed between the pulley body and the connection member.

The at least one elastic spring may be a pair of elastic springs, and the pair of elastic springs may be disposed to face each other with the pulley body being interposed therebetween.

The pair of pulleys may include a first pulley disposed at a first side of the battery cell assembly; and a second pulley spaced apart from the first pulley and disposed at a second side of the battery cell assembly.

The pair of elastic straps may include a first elastic strap connected to the first pulley; and a second elastic strap spaced apart from the first elastic strap and connected to the second pulley.

The at least one battery cell may be a plurality of battery cells, and the plurality of battery cells may be stacked on each other in the vertical direction.

In addition, the present disclosure further provides a battery pack, comprising: at least one battery module according to the above embodiments; and a pack case configured to package the at least one battery module.

Moreover, the present disclosure further provides a vehicle, comprising at least one battery pack according to the above embodiments.

Each elastic strap of the pair of elastic straps may have a strap guide contacting the pulley body and a strap band connected to the strap guide.

The pulley body has a surface may be inclined inwardly from each of two edges toward a middle portion.

The strap guide may have a surface inclined from each edge toward a middle portion.

Advantageous Effects

According to various embodiments as described above, it is possible to provide a battery module, which may improve the performance of a battery cell and effectively control cell swelling, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
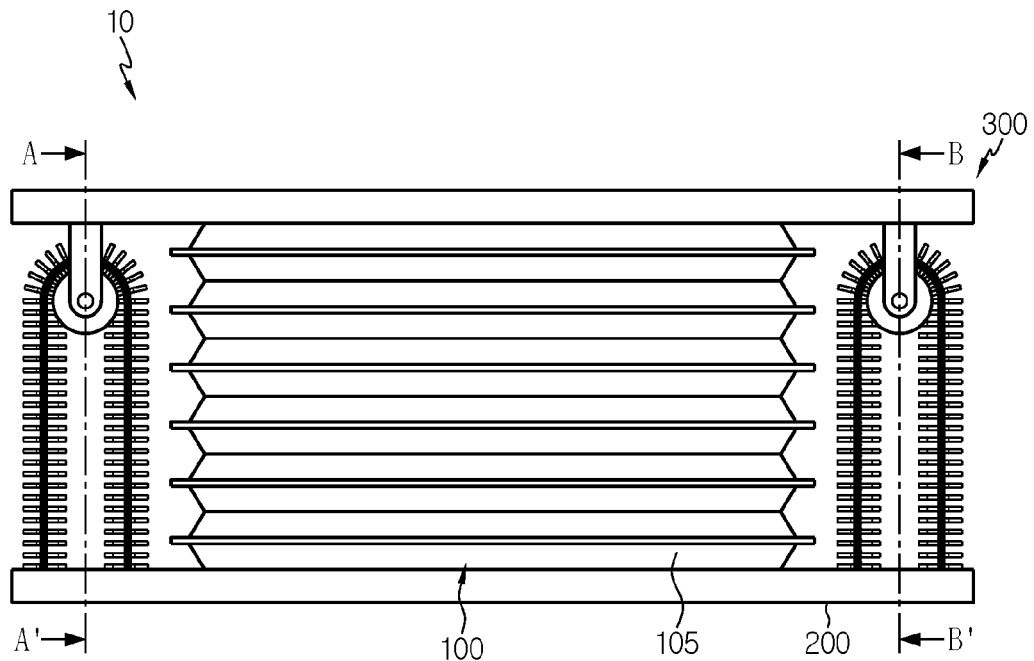
FIG. 1 is a diagram for illustrating a battery module according to an embodiment of the present disclosure.
Figure 2:
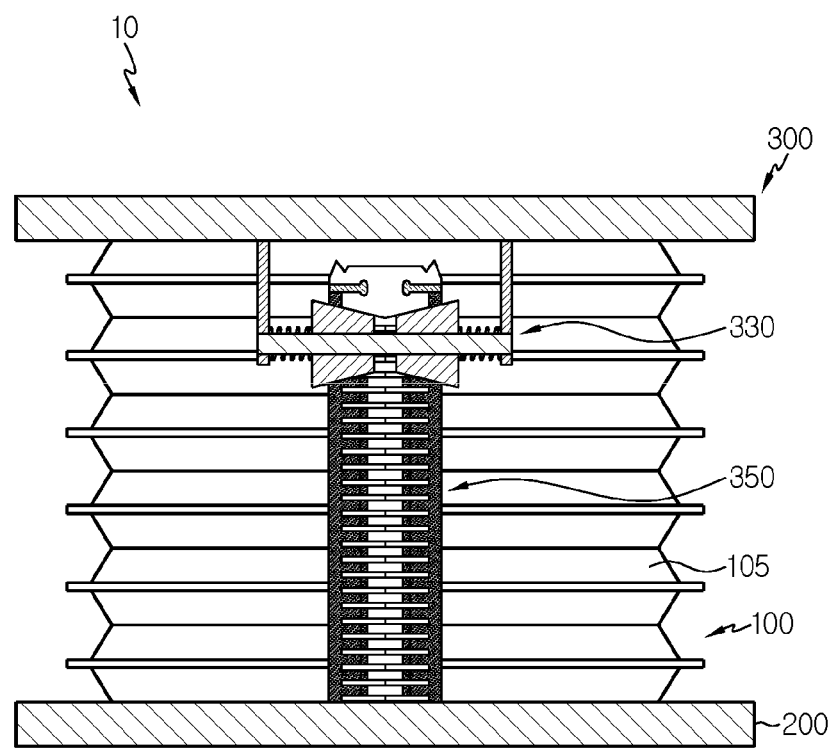
FIG. 2 is a sectional view, taken along the line A-A' of FIG. 1.
Figure 3:
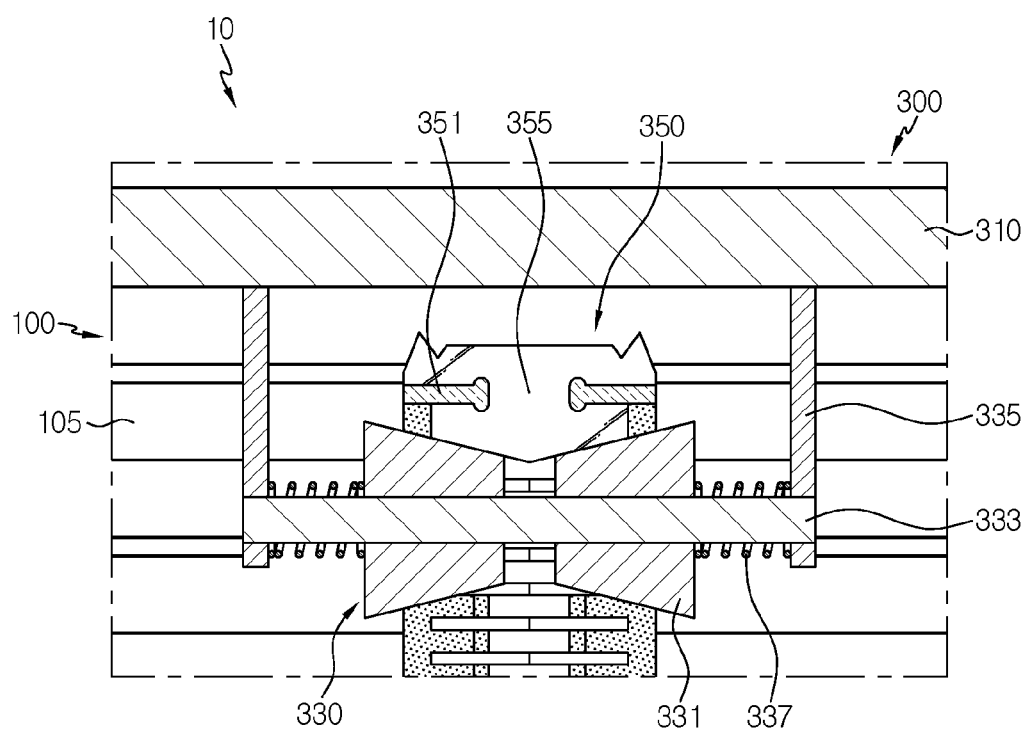
FIG. 3 is an enlarged view showing a main part of FIG. 2.
Figure 4:
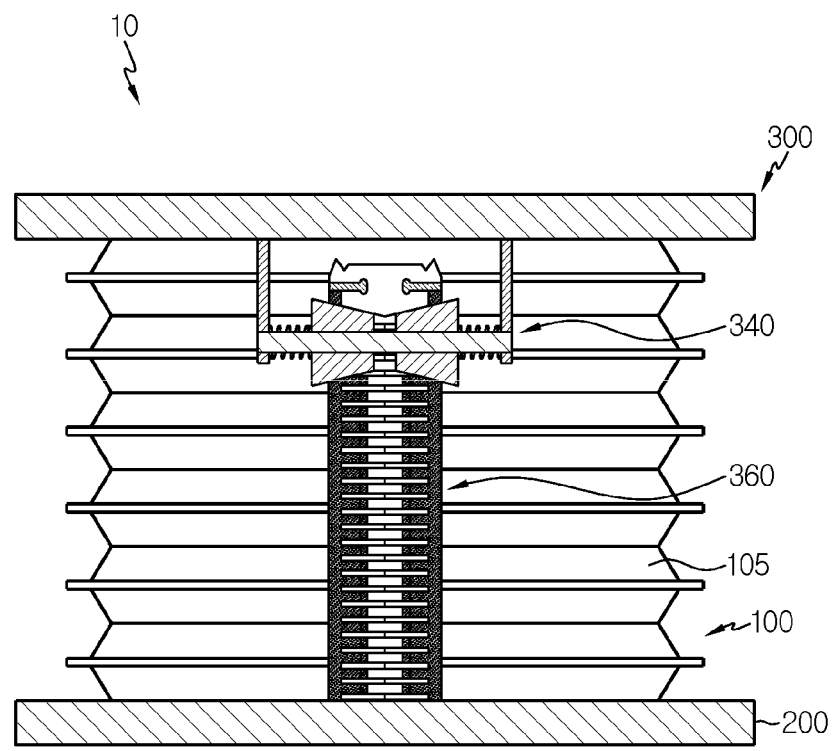
FIG. 4 is a sectional view, taken along the line B-B' of FIG. 1.
Figure 5:
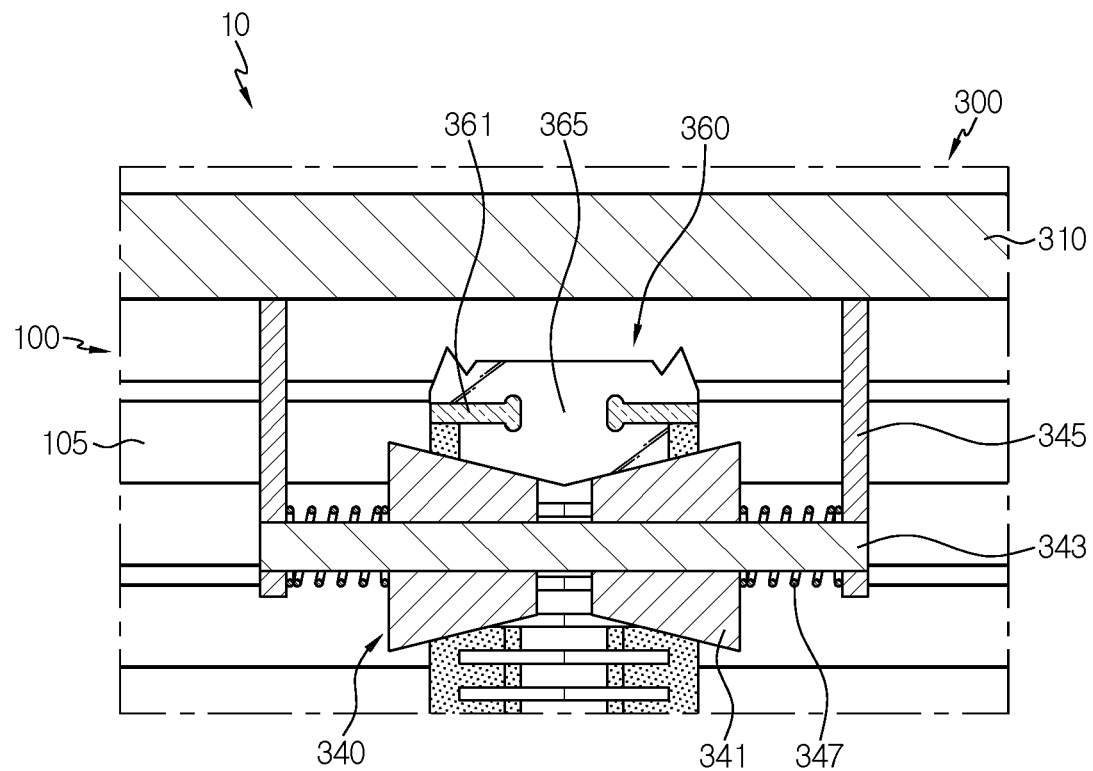
FIG. 5 is an enlarged view showing a main part of FIG. 4.

FIG. 1 is a diagram for illustrating a battery module according to an embodiment of the present disclosure, FIG. 2 is a sectional view, taken along the line A-A' of FIG. 1, FIG. 3 is an enlarged view showing a main part of FIG. 2, FIG. 4 is a sectional view, taken along the line B-B' of FIG. 1, and FIG. 5 is an enlarged view showing a main part of FIG. 4.

Referring to FIGS. 1 to 5, the battery module 10 may include a battery cell assembly 100, a base plate 200, and a pressing pulley unit 300.

The battery cell assembly 100 may include at least one battery cell 105 or a plurality of battery cells 105. Hereinafter, in this embodiment, it will be described that a plurality of battery cells 105 are provided.

The plurality of battery cells 105 may be stacked on each other in a height direction of the battery cell assembly 100. The plurality of battery cells 105 are secondary batteries, and may be provided as a pouch-type secondary battery, a prismatic secondary battery, or a cylindrical secondary battery. Hereinafter, in this embodiment, the battery cell 105 will be described as a pouch-type secondary battery.

The base plate 200 may support a lower side of the battery cell assembly 100. The base plate 200 may have a shape and size capable of supporting the lower side of the battery cell assembly 100.

The pressing pulley unit 300 may be elastically connected to the base plate 200, cover an upper side of the battery cell assembly 100, and be elastically deformed in the vertical direction of the battery cell assembly 100 according to cell swelling of the battery cell assembly 100.

The pressing pulley unit 300 may include a pressing plate 310, a pair of pulley units 330, 340, and a pair of elastic straps 350, 360.

The pressing plate 310 may be disposed at an upper side of the battery cell assembly 100. The pressing plate 310 may have a shape and size capable of covering the upper side of the battery cell assembly 100. The pressing plate 310 may be provided to be elastically movable along the vertical direction of the battery cell assembly 100.

The pair of pulley units 330, 340 may be connected to the pressing plate 310 and disposed at both sides of the battery cell assembly 100.

The pair of pulley units 330, 340 may include a first pulley unit 330 and a second pulley unit 340.

The first pulley unit 330 may be disposed at one side of the battery cell assembly 100.

The first pulley unit 330 may include a pulley body 331, a pulley shaft 333, a connection member 335 and an elastic spring 337.

The pulley body 331 may be connected to an elastic strap 350, explained later. Specifically, the pulley body 331 may be connected to be engaged with a strap guide 355 of the first elastic strap 350, explained later.

More specifically, the pulley body 331 has a shape corresponding to the shape of the strap guide 355 of the first elastic strap 350, explained later, and may be provided in a downwardly inclined shape toward the center of the pulley shaft 333, explained later.

The pulley shaft 333 is formed in a predetermined length and may be provided through the pulley body 331.

The connection member 335 may connect the pulley shaft 333 and the pressing plate 310. The connection member 335 may be connected to both ends of the pulley shaft 333 and fixed to the pressing plate 310.

The elastic spring 337 is provided to the pulley shaft 333 and may be disposed between the pulley body 331 and the connection member 335. The elastic spring 337 may be provided as a pair. The pair of elastic springs 337 may be disposed to face each other with the pulley body 331 being interposed therebetween.

The second pulley unit 340 is spaced apart from the first pulley unit 330 and may be disposed at the other side of the battery cell assembly 100.

The second pulley unit 340 may include a pulley body 341, a pulley shaft 343, a connection member 345, and an elastic spring 347.

The pulley body 341 may be connected to an elastic strap 360, explained later. Specifically, the pulley body 341 may be connected to be engaged with a strap guide 365 of the second elastic strap 360, explained later.

More specifically, the pulley body 341 has a shape corresponding to the shape of the strap guide 365 of the second elastic strap 360, explained later, and may be provided in a downwardly inclined shape toward the center of the pulley shaft 343, explained later.

The pulley shaft 343 is formed in a predetermined length and may be provided through the pulley body 341.

The connection member 345 may connect the pulley shaft 343 and the pressing plate 310. The connection member 345 may be connected to both ends of the pulley shaft 343 and fixed to the pressing plate 310.

The elastic spring 347 is provided to the pulley shaft 343 and may be disposed between the pulley body 341 and the connection member 345. The elastic spring 347 may be provided as a pair. The pair of elastic springs 347 may be disposed to face each other with the pulley body 341 being interposed therebetween.

The pair of elastic straps 350, 360 are connected to the pair of pulley units 330, 340, and may be fixed to the base plate 200.

The pair of elastic straps 350, 360 may include a first elastic strap 350 and a second elastic strap 360.

The first elastic strap 350 may be elastically connected to the first pulley unit 330.

The first elastic strap 350 may include a strap band 351 and a strap guide 355.

The strap band 351 is made of an elastic material in a predetermined length and may be fixedly mounted Oto the base plate 200. For example, the strap band 351 may be made of a metal material having a predetermined elasticity. The present disclosure is not limited thereto, and the strap band 351 may also be made of materials having a predetermined elasticity other than the metal material, for example, a rubber material.

The strap guide 355 is provided to the strap band 351, and at least one strap guide 355 or a plurality of strap guides 355 may be provided. The strap guide 355 may be made of a metal material.

The strap guide 355 may be connected to the pair of pulley units 330, 340. Specifically, the strap guide 355 may be connected to be engaged with the pulley body 331 of the first pulley unit 330.

Here, the strap guide 355 may be formed to have a cross section inclined downward. Due to the inclined shape of the strap guide 355, the elastic sliding of the pulley body 331 of the first pulley unit 330 in the horizontal direction may be performed more conveniently when the pressing pulley unit 300 controls cell swelling.

The second elastic strap 360 is spaced apart from the first elastic strap 350 and may be elastically connected to the second pulley unit 340.

The second elastic strap 360 may include a strap band 361 and a strap guide 365.

The strap band 361 is made of an elastic material in a predetermined length and may be fixedly mounted to the base plate 200. For example, the strap band 361 may be made of a metal material having a predetermined elasticity. The present disclosure is not limited thereto, and the strap band 361 may also be made of materials having a predetermined elasticity other than the metal material, for example, a rubber material.

The strap guide 365 is provided to the strap band 361, and at least one strap guide 365 or a plurality of strap guides 365 may be provided. The strap guide 365 may be made of a metal material.

The strap guide 365 may be connected to the pair of pulley units 330, 340. Specifically, the strap guide 365 may be connected to be engaged with the pulley body 341 of the second pulley unit 340.

Here, the strap guide 365 may be formed to have a cross section inclined downward. Due to the inclined shape of the strap guide 365, the elastic sliding of the pulley body 341 of the second pulley unit 340 in the horizontal direction may be performed more conveniently when the pressing pulley unit 300 controls the cell swelling.

Hereinafter, the operation of the pressing pulley unit 300 according to this embodiment when cell swelling occurs in the battery module 10 will be described in detail.

Figure 6:
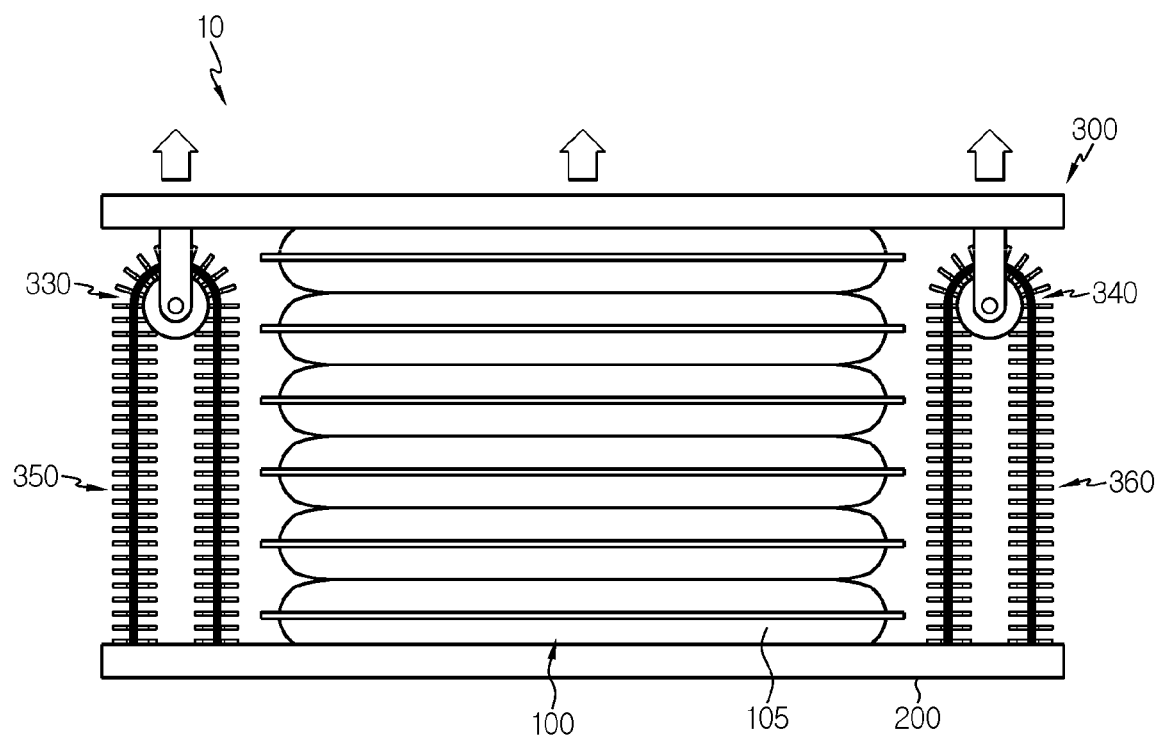
FIGS. 6 and 7 are diagrams for illustrating an operation of a pressing pulley unit of the battery module of FIG. 1.
Figure 7:
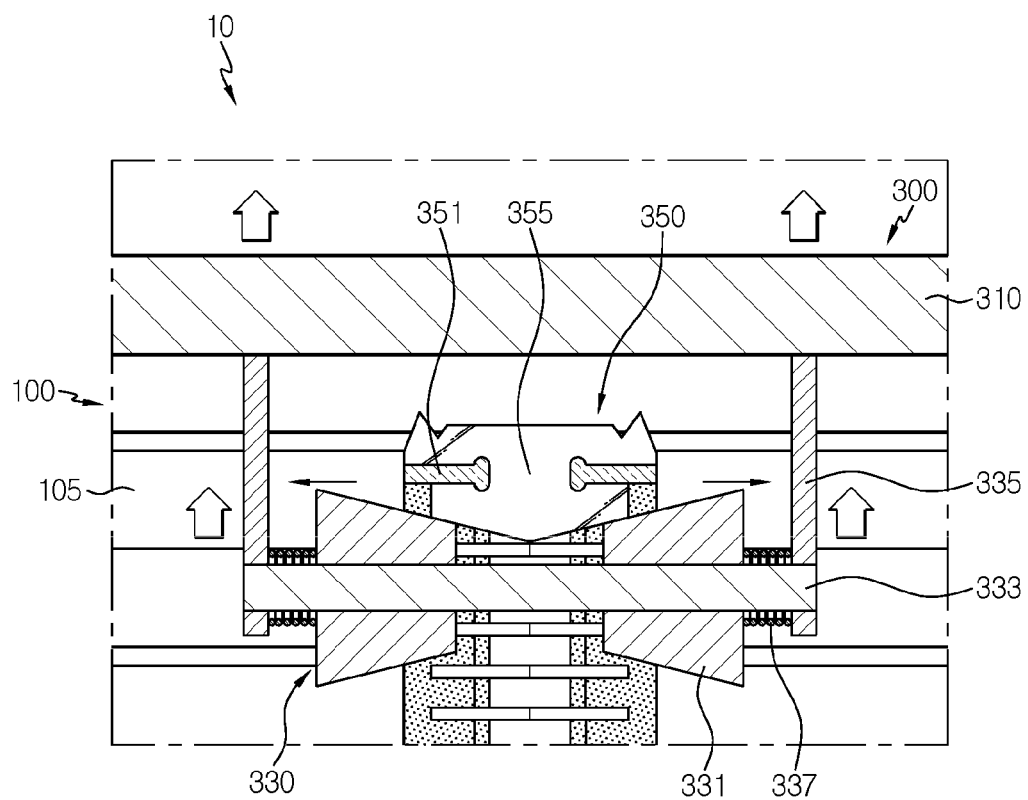

FIGS. 6 and 7 are diagrams for illustrating an operation of a pressing pulley unit of the battery module of FIG. 1.

Referring to FIGS. 6 and 7, cell swelling may occur in the battery module 10 due to expansion or the like of the battery cells 105 of the battery cell assembly 100.

When the cell swelling occurs, by raising the pressing plate 310, the pressing pulley unit 300 may effectively prevent the pressure applied to the battery cells 105 from excessively increasing.

For example, as shown in FIG. 7, when the pressing plate 300 is raised according to the cell swelling, the pulley body 331 of the first pulley unit 330 of the pressing pulley unit 300 may slide in the horizontal direction toward the facing connection member 335.

At this time, the pulley body 331 may slide along the engaged inclined cross-section of the strap guide 335 connected to the strap band 351 of the first elastic strap 350. Accordingly, problems such as interference that may occur when the pulley body 331 slides may be minimized.

Moreover, the pair of elastic springs 337 of the first pulley unit 330 may guide the sliding of the pulley body 331 while being compressed according to the sliding of the pulley body 331 to buffer the cell swelling force at least partially.

Meanwhile, although not shown, when the cell swelling occurs, the second pulley unit 340 may also operate with the same mechanism as the first pulley unit 330.

As such, the pressing pulley unit 300 according to this embodiment may maintain the pressure level at a certain level by changing the height regulating the battery cells 105 according to elasticity, using the force generated by the battery cells 105 of the battery cell assembly 100 in itself as an actuating force.

Maintaining the feature of maintaining a constant pressure level through the pressing pulley unit 300 may be applied not only to cell swelling of the battery cells 105 of the battery cell assembly 100, but also to providing a predetermined pressing force for improving the lifespan performance of the battery cells 105. That is, the pressing pulley unit 300 may prevent the performance of the battery cells 105 from deteriorating while maintaining the performance of the battery cells 105 by providing a constant pressing force toward the battery cells 105 even before the cell swelling occurs.

Figure 8:
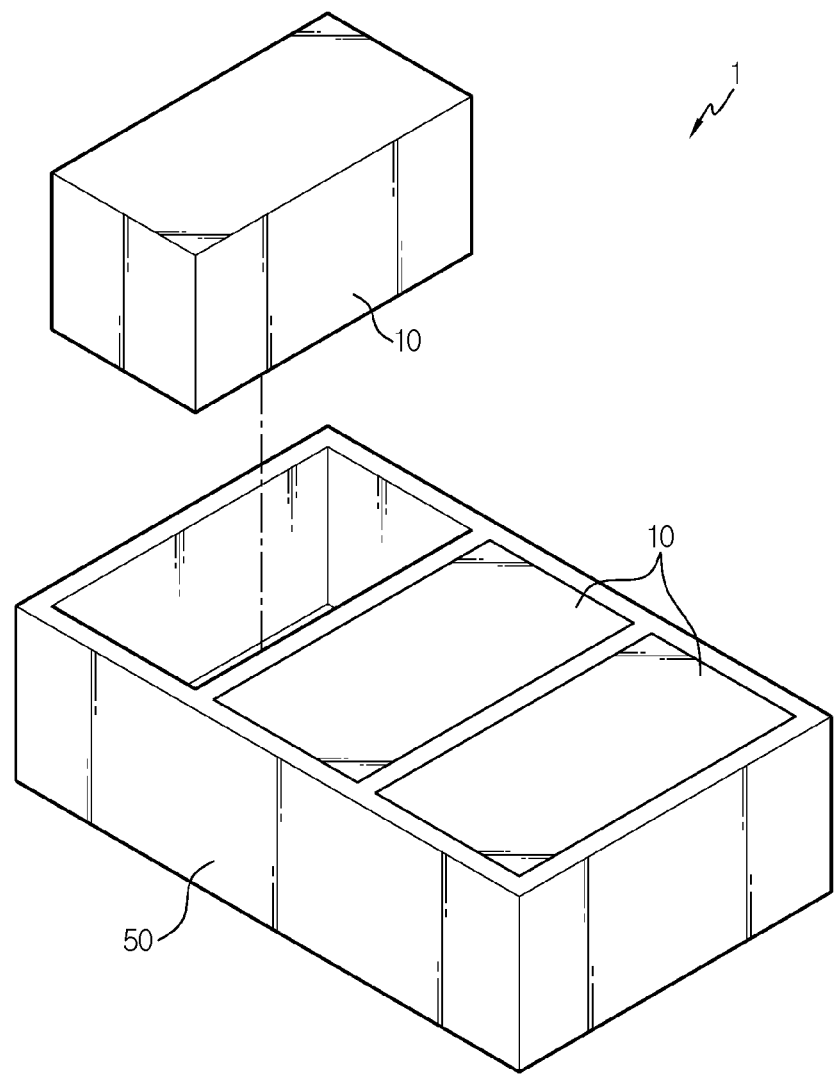
FIG. 8 is a diagram for illustrating a battery pack according to an embodiment of the present disclosure.
Figure 9:
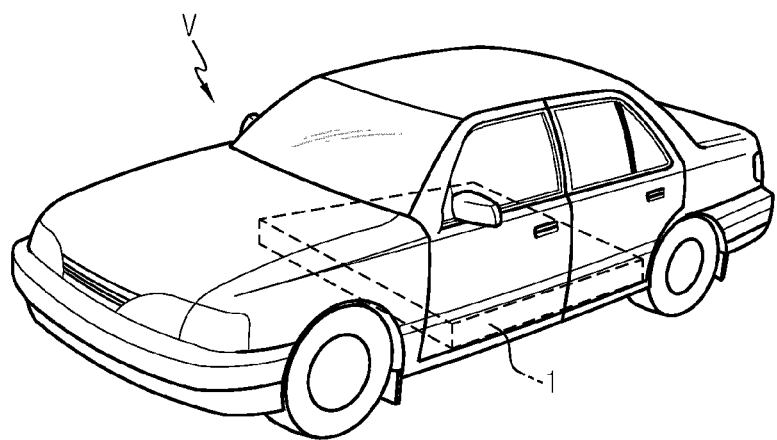
FIG. 9 is a diagram for illustrating a vehicle according to an embodiment of the present disclosure.

FIG. 8 is a diagram for illustrating a battery pack according to an embodiment of the present disclosure, and FIG. 9 is a diagram for illustrating a vehicle according to an embodiment of the present disclosure.

Referring to FIGS. 8 and 9, a battery pack 1 may include at least one battery module 10 and a pack case 50 for packaging the at least one battery module 10 according to the former embodiment.

The battery pack 1 may be provided to a vehicle V as a fuel source of the vehicle. As an example, the battery pack 1 may be provided to an electric vehicle, a hybrid electric vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as the vehicle, which have the battery pack 1, include the battery module 10 as described above, and thus it is possible to implement a battery pack 1 having all the advantages of the battery module 10 described above, or devices, instruments, facilities or the like such as the vehicle V, which have the battery pack 1.

According to various embodiments as described above, it is possible to provide the battery module 10, which may improve the performance of the battery cell 105 and effectively control cell swelling, the battery pack 1 including the battery module 10, and the vehicle V including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a battery cell assembly including at least one battery cell;
   a base plate configured to support a lower side of the battery cell assembly;
   a pressing plate configured to cover an upper side of the battery cell assembly;
   at least one pulley fixed to the pressing plate; and
   at least one elastic strap fixed to the base plate and connected to the at least one pulley.

2. The battery module according to claim 1,
   wherein the at least one pulley is a pair of pulleys connected to the pressing plate and respectively disposed at a pair of sides of the battery cell assembly; and
   wherein the at least one elastic strap is a pair of elastic straps respectively connected to the pair of pulleys.

3. The battery module according to claim 2, wherein each of the pair of pulleys includes:
   a pulley body connected to the elastic strap;
   a pulley shaft provided through the pulley body; and
   a connection member configured to connect the pulley shaft and the pressing plate.

4. The battery module according to claim 3, wherein each of the pair of pulleys include at least one elastic spring provided to the pulley shaft and disposed between the pulley body and the connection member.

5. The battery module according to claim 4, wherein the at least one elastic spring is a pair of elastic springs, and
   wherein the pair of elastic springs are disposed to face each other with the pulley body being interposed therebetween.

6. The battery module according to claim 2, wherein the pair of pulleys include;
   a first pulley disposed at a first side of the battery cell assembly; and
   a second pulley spaced apart from the first pulley and disposed at a second side of the battery cell assembly.

7. The battery module according to claim 6, wherein the pair of elastic straps include:
   a first elastic strap connected to the first pulley; and
   a second elastic strap spaced apart from the first elastic strap and connected to the second pulley.

8. The battery module according to claim 1, wherein the at least one battery cell is a plurality of battery cells, and
   wherein the plurality of battery cells are stacked on each other in the vertical direction.

9. A battery pack, comprising:
   at least one battery module as defined in claim 1; and
   a pack case configured to package the at least one battery module.

10. A vehicle, comprising:
    at least one battery pack as defined in claim 9.

11. The battery module according to claim 3, wherein each elastic strap of the pair of elastic straps comprises a strap guide contacting the pulley body and a strap band connected to the strap guide.

12. The battery module according to claim 11, wherein the pulley body has a surface inclined inwardly from each of two edges toward a middle portion.

13. The battery module according to claim 12, wherein the strap guide has a surface inclined from each edge toward a middle portion.

14. The battery module according to claim 1, wherein the at least one pulley is fixed to a bottom surface of the pressing plate and extends downwardly from the bottom surface of the pressing plate.

15. The battery module according to claim 1, wherein two ends of the at least one elastic strap are fixed to the base plate.

16. The battery module according to claim 15, wherein the pulley connects to the at least one elastic strap between the two ends of the at least one elastic strap.

* * * * *